United States Patent [19]
Fitch et al.

[11] Patent Number: 6,097,754
[45] Date of Patent: Aug. 1, 2000

[54] METHOD OF AUTOMATICALLY DETECTING THE BAUD RATE OF AN INPUT SIGNAL AND AN APPARATUS USING THE METHOD

[75] Inventors: Kenneth D. Fitch, Allentown, Pa.; Prabhat K. Jain, Woburn, Mass.; Walter G. Soto, Irvine, Calif.

[73] Assignee: Lucent Technologies, Inc., Murray Hill, N.J.

[21] Appl. No.: 09/030,718

[22] Filed: Feb. 25, 1998

[51] Int. Cl.[7] .............................. H04B 1/38; H04L 23/00; H04M 11/00
[52] U.S. Cl. ......................... 375/222; 375/377; 379/93.8
[58] Field of Search ................................... 375/222, 225, 375/354, 369, 316, 355, 377, 342; 379/93.08; 370/304, 305, 294

[56] References Cited

U.S. PATENT DOCUMENTS

| | | | |
|---|---|---|---|
| 5,008,902 | 4/1991 | Key et al. ................................ | 375/225 |
| 5,168,493 | 12/1992 | Nelson et al. ........................... | 370/314 |
| 5,222,081 | 6/1993 | Lewis et al. ............................ | 375/369 |
| 5,369,682 | 11/1994 | Witsaman et al. ....................... | 379/57 |
| 5,490,209 | 2/1996 | Kennedy et al. ..................... | 379/93.08 |
| 5,631,952 | 5/1997 | O'Barr et al. ....................... | 379/93.01 |
| 5,654,983 | 8/1997 | Suaser, Jr. .............................. | 375/225 |

*Primary Examiner*—Chi H. Pham
*Assistant Examiner*—Khai Tran
*Attorney, Agent, or Firm*—Ratner & Prestia

[57] ABSTRACT

A method of automatically detecting the baud rate of an input signal and an apparatus using the method. A counter is started upon detecting a first transition of the input signal. The counter is stopped upon detecting a second transition of the input signal. After the counter is stopped, the measured count in the counter represents the duration between the first and second transitions of the input signal. The measured count is compared to a plurality of expected counts to determine which of the plurality of expected counts has a value closest to the measured count. The input signal is sampled using a baud rate based on the expected count having a value closest to the measured count.

15 Claims, 5 Drawing Sheets

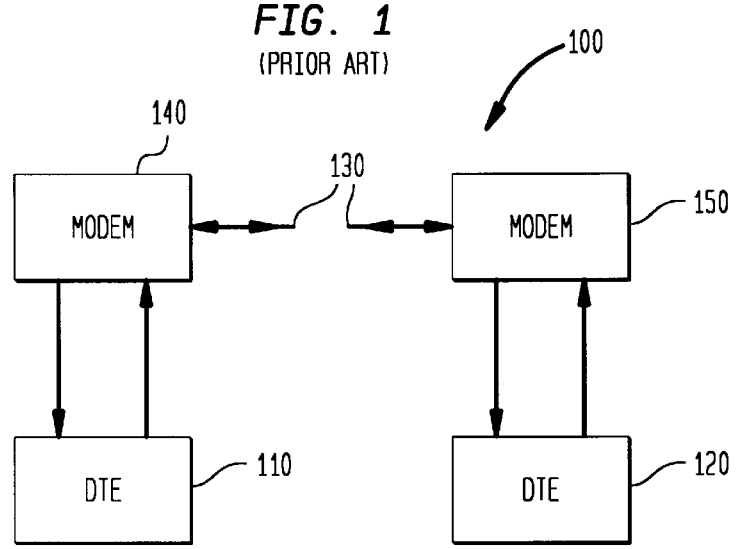
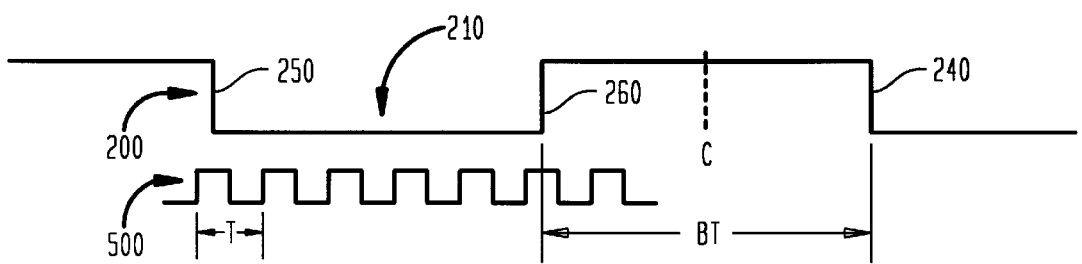

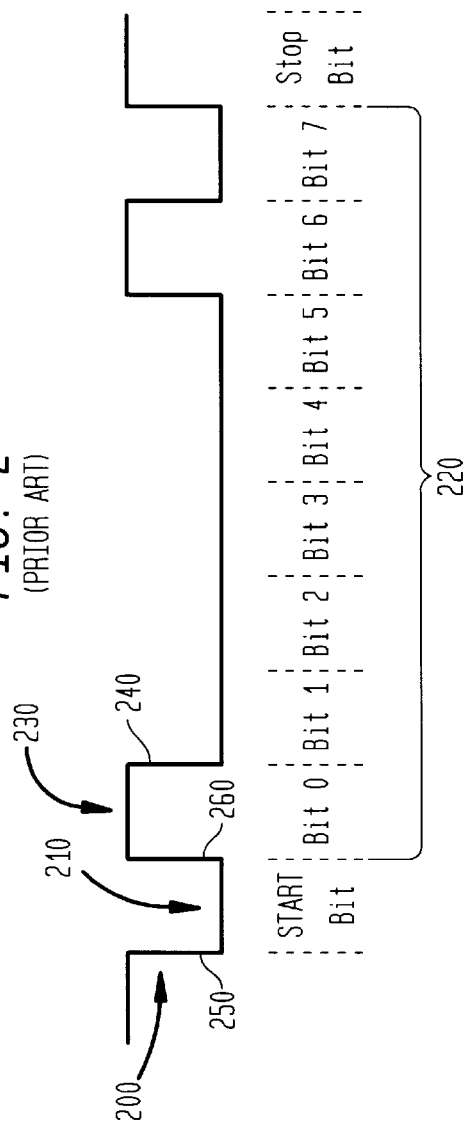
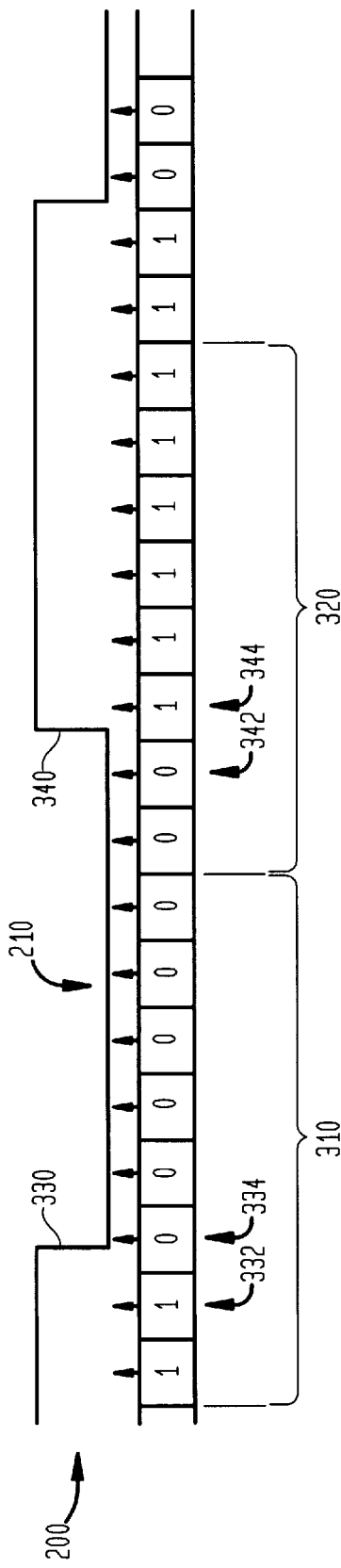

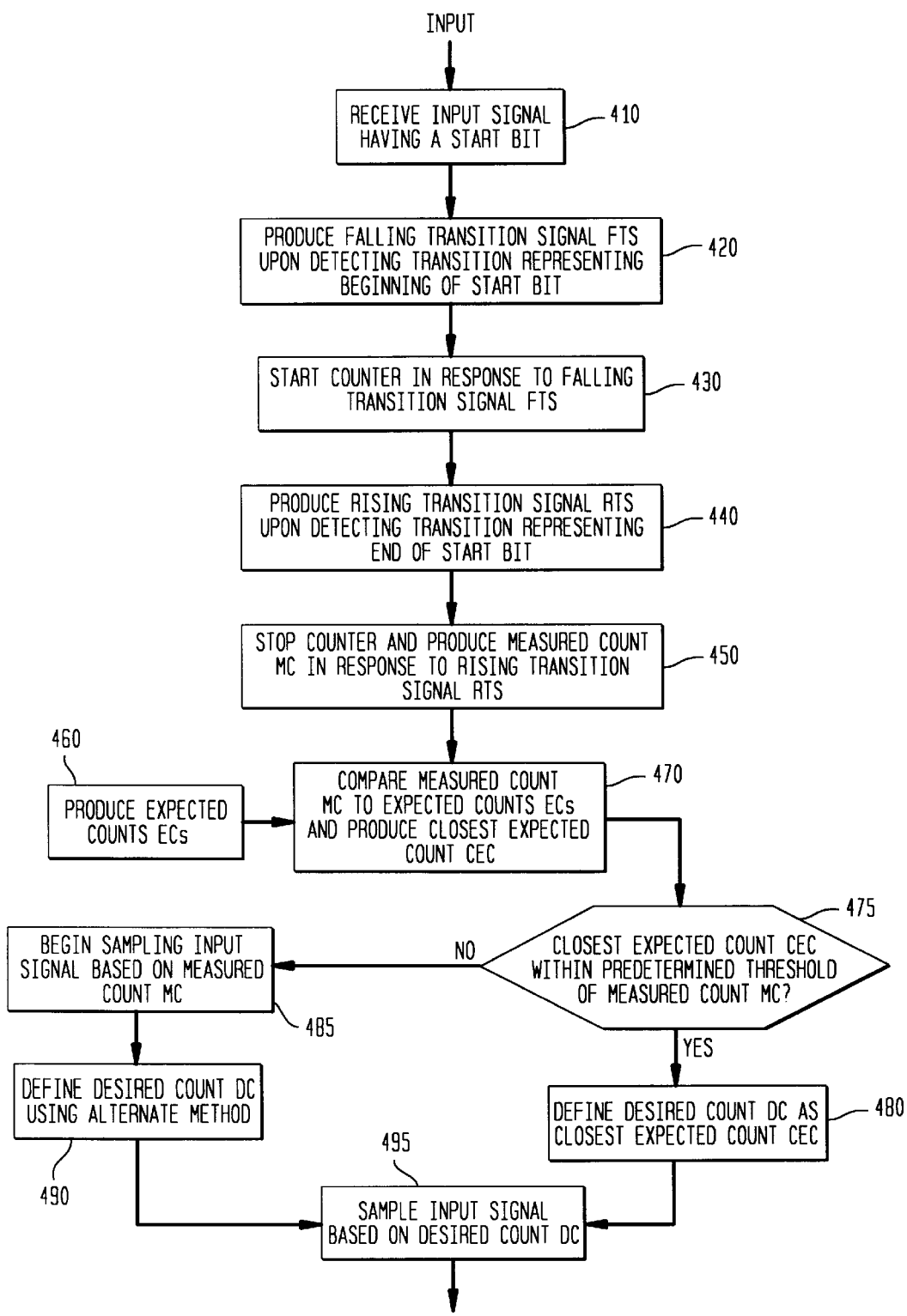

METHOD OF AUTOMATICALLY DETECTING THE BAUD RATE OF AN INPUT SIGNAL AND AN APPARATUS USING THE METHOD

TECHNICAL FIELD

This invention relates generally to the automatic detection of the baud rate of an input signal. More specifically, this invention relates to determining the baud rate of an input signal based on the duration between the edge transitions of a start bit of the input signal.

BACKGROUND OF THE INVENTION

In data communication systems, data may be transmitted and received at a number of different data rates. The term baud rate is often used to describe a data rate expressed in bits per second (bps). For example, a transmission of data at a rate of 14,400 bps may be referred to as a transmission at 14,400 baud. When the baud rate of an input signal is not known, automatic baud rate detection (autobauding) may be used to determine the baud rate of the input signal.

As shown in FIG. 1, a conventional data communication system includes data terminal equipment (DTE) 110, 120 connected to a communications medium 130 through a modulator/demodulator (modem) 140, 150. It is desirable for a modem 140, 150 to receive transmissions from the DTE 110, 120 at a variety of baud rates. Autobauding, may be used to synchronize the transmission and reception baud rates between a DTE 110, 120 and a modem 140, 150.

A conventional method of autobauding is often performed while the DTE 110, 120 sends commands to the modem 140, 150 in a command mode. For example, when an input signal 200 shown in FIG. 2 includes an AT command of the AT command set, the baud rate of the input signal 200 may be determined using the start bit 210 preceding the "A" character 220 of the AT command. The "A" character 220 shown in FIG. 2 is represented by the ASCII value of 0x41 in a least significant bit first format.

A conventional method of autobauding is described by Sauser in U.S. Pat. No. 5,654,983. With reference to FIG. 3, the method of autobauding uses the number of samples between the first transition 330 and second transition 340 of a start bit 210 of an input signal 200. As shown in FIG. 3, the start bit 210 of the input signal 200 is continuously sampled. A first byte of samples 310 and a second byte of samples 320 are shown.

Each byte of samples is compared to a register containing all "1"s to detect a transition of the input signal 200 occurring during that byte. When byte 310 is compared to a register containing all "1"s, the first transition 330 occurring between sample 332 and sample 334 at the beginning of the start bit 210 is detected. The byte 310 is then further analyzed to determine between which samples the first transition 330 occurred. A similar procedure is followed to determine that the second transition 340 at the end of the start bit 210 occurs during the byte 320 and to determine that the second transition 340 occurred between sample 342 and sample 344 of byte 320.

The baud rate of the input signal 209 is calculated based on the number of samples taken during the start bit 210 and based on the known rate of sampling. For example, as shown in FIG. 3, eight samples are taken between the first and second transitions 330, 340 at the beginning and at the end of the start bit 210. If the input signal 200 is sampled at a rate of 8K samples per second, the baud rate of the input signal 200 would be 1K baud.

SUMMARY OF THE INVENTION

The present invention provides a method of automatically detecting the baud rate of an input signal and an apparatus using the method. A counter is started upon detecting a first transition of the input signal. The counter is stopped upon detecting a second transition of the input signal. After the counter is stopped, the measured count in the counter represents the duration between the first and second transitions of the input signal. The measured count is compared to a plurality of expected counts to determine which of the plurality of expected counts has a value closest to the measured count. The input signal is sampled using a baud rate based on the expected count closest to the measured count.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 1 is a block diagram of a conventional data communication system;

FIG. 2 is diagram of an input signal including a start bit and the character "A";

FIG. 3 is a diagram illustrating a conventional method of autobauding;

FIG. 4 is a flow chart describing an exemplary embodiment of a method according to the present invention;

FIG. 5 is a timing diagram illustrating a method of autobauding according to an exemplary embodiment of the present invention;

DETAILED DESCRIPTION OF THE INVENTION

Figure 6:
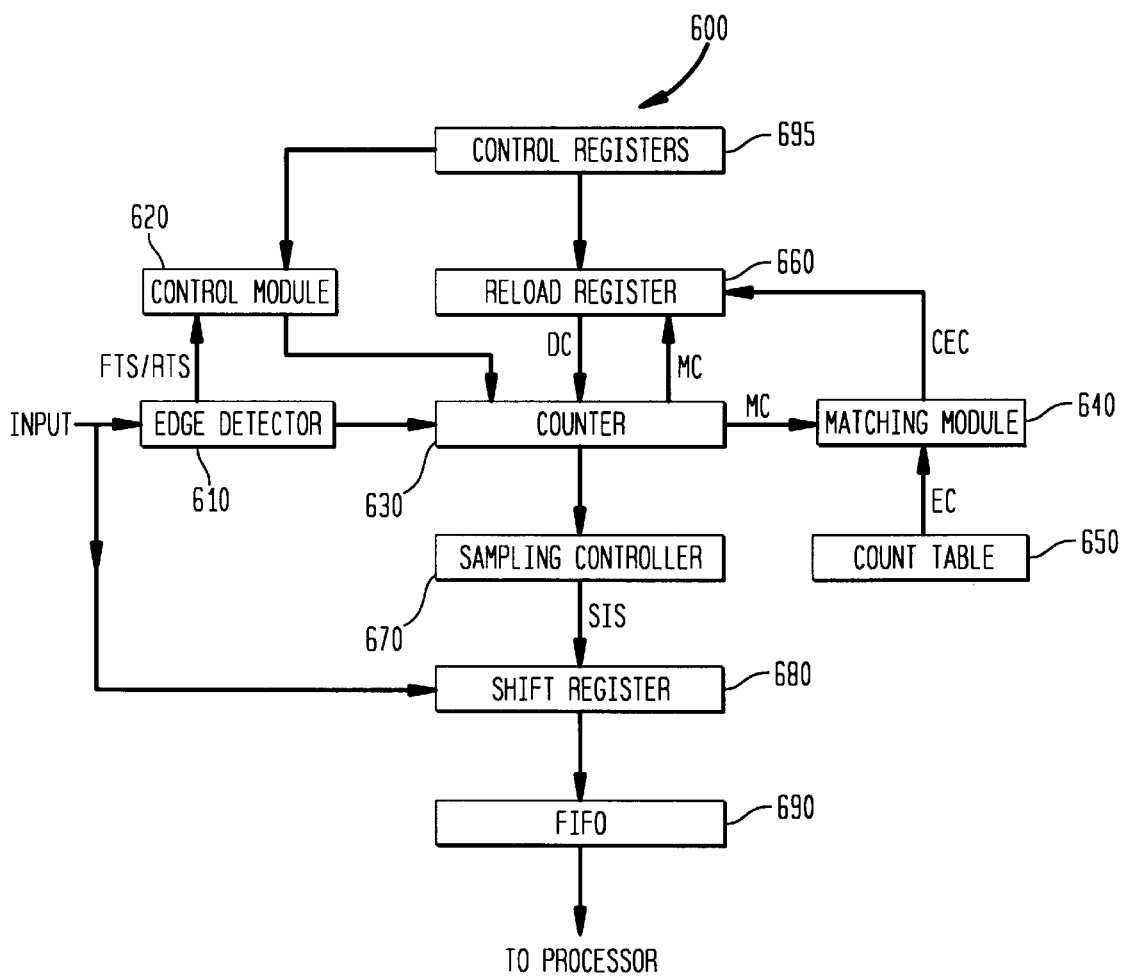
FIG. 6 is an apparatus according to an exemplary embodiment according to the present invention.

Referring now to the drawing, wherein like reference numerals refer to like elements throughout, FIG. 4 shows a flow chart illustrating a method of autobauding according to an exemplary embodiment of the present invention. In step 410 an INPUT signal is received. As shown in FIG. 5, the INPUT signal 200 includes a start bit 210.

The start bit 210 begins with a first transition 250 and ends with a second transition 260. In step 420, the first transition 330 of the start bit 210 is detected. Upon detecting the first transition 250, a Falling Transition Signal FTS is produced. The start bit 210 shown in FIG. 5 begins with a falling edge transition 250 and ends with a rising edge transition 260. As known to those skilled in the art, the teachings of this invention may be applied to other start bits such as a start bit beginning with a rising edge transition and ending with a falling edge transition.

In step 430, in response to the Falling Transition Signal FTS corresponding to the beginning of the start bit 210, a counter is started. The count of the counter is synchronized with a system clock signal 500 shown in FIG. 5. In step 440, the second transition 260 of the start bit 210 is detected. Upon detecting the second transition 260, a Rising Transition Signal RTS is produced. In step 450, in response to the Rising Transition Signal RTS corresponding to the end of the start bit 210, the counter is stopped.

The value in the counter when it was stopped, defined as the Measured Count MC, is produced after the counter is stopped. The Measured Count MC represents the duration between the first and second transitions 250, 260 of the start bit 210 in units of system clock 500 time periods T.

In step 460, Expected Counts ECs are produced. Each Expected Count represents an expected duration between first and second transitions 250, 260 of start bits 210 of INPUT signals having different baud rates. Table 1 below gives examples of expected counts for several INPUT signal baud rates for a given system clock 500 frequency.

TABLE 1

| System Clock (Hz) | INPUT Signal (baud) | Expected Count |
|---|---|---|
| 2,304,000 | 230.4K | 10 |
| 2,304,000 | 115.2K | 20 |
| 2,304,000 | 28.8K | 80 |
| 2,304,000 | 14.4K | 160 |

In step 470, the measured count MC is compared to the expected counts ECs. The expected count closest to the measured count MC, defined as the closest expected count CEC, is produced. In another exemplary embodiment, the INPUT signal is then sampled based on the closest expected count CEC.

In the exemplary embodiment of FIG. 4, in step 475 the closest expected count CEC is compared to the measured count MC. If the closest expected count CEC is within a predetermined threshold of the measured count MC, in step 480 the desired count DC is defined to be the closest expected count CEC, and in step 495 the INPUT signal is sampled based on the desired count DC.

If the Closest Expected Count CEC is not within the predetermined threshold of the Measured Count MC, in step 485 sampling of the INPUT signal begins based on the Measured Count MC and in step 490 an alternate method is used to determine the Desired Count DC. After the Desired Count DC is determined using the alternate method, in step 495 sampling of the INPUT signal continues but based on the Desired Count DC rather than the Measured Count MC.

In a preferred embodiment, steps 470 and 475 are combined wherein the measured count is compared to an expected count to determine whether the measured count is within a predetermined threshold of the expected count. If not within a predetermined threshold, the measured count is then compared to another expected count to determine whether the measured count is within a predetermined threshold of the other expected count. This process continues until the measured count is within a predetermined threshold of an expected count or until there are no additional expected counts. Steps 470 and 475 may compare the measured count to each of the expected counts in parallel.

The predetermined threshold may be a fixed value. When the predetermine threshold is a fixed value, an expected count will be defined to be the desired count when the difference between the expected count and the measured count is less than this fixed value. The predetermined threshold may also be other than a fixed value as known to those skilled in the art. For example, the predetermined threshold may be a percentage of an expected count.

An autobaud apparatus 600 according to an embodiment of the present invention is shown in FIG. 6. The Edge Detector 610 receives an INPUT signal 200 shown in FIG. 5. The Edge Detector 610 produces a Falling Transition Signal FTS upon detecting the first transition 250 at the beginning of a start bit 210. The control module 620 receives the Falling Transition Signal FTS and starts the counter 630 in response to the Falling Transition Signal FTS.

The edge detector 610 produces a Rising Transition Signal RTS upon detecting the second transition 260 at the end of a start bit 210. The control module 620 receives the Rising Transition Signal RTS and stops the counter 630 in response to the Rising Transition Signal RTS. The value in the counter 630, defined as the measured count MC, is received by the matching module 640. The matching module 640 compares the measured count MC to expected counts ECs in the count table 650.

The edge detector 610 may be implemented using D-type flip-flops. For example, a rising edge triggered D-type flip-flop can generate the Rising Transition Signal RTS if its D input is tied high, its clock input is the INPUT signal 200, and its reset (or clear) input is controlled by the control module 620. The control module 620 can reset the flip-flop after an edge has been detected and a further edge is to be detected. Thus, a rising edge of the INPUT signal 200 will result in a high level on the Rising Transition Signal RTS to indicate detection of a rising edge on the INPUT signal 200. The Falling Transition Signal FTS can similarly be generated using a falling edge triggered D-type flip-flop. The use of a flip-flip to detect an edge transition is known to those skilled in the art and described by John F. Wakerly in *Digital Design Principles and Practices*, 358–360 (1990).

The matching module 640 provides the expected count in the count table 650 that is closest to the measured count MC, defined as the closest expected count CEC, to the reload register 660. In an exemplary embodiment, the matching module 640 is implemented in a state machine using a system clock as its clock input. Preferably, the system clock has a frequency of 30 MHz that results in a clock period of 33n Sec. which allows the matching module 640 sufficient execution time to provide the closest expected count CEC to the reload register 660 without the loss of a bit. As known to those skilled in the art, the frequency of the clock to the matching module 640 may be increased for autobauding with faster INPUT signal 200 baud rates.

The reload register 660 provides a desired count DC to the counter 630. When the difference between the closest expected count CEC and the measured count MC is less than a predetermined threshold, the desired count DC is based on the closest expected count CEC. When the difference exceeds the predetermined threshold, the INPUT signal is sampled using the measured count MC. Preferably, when the difference exceeds the predetermined threshold, the INPUT signal will be sampled using a desired count DC after an alternate method is used to determine the desired count DC.

The number of expected counts ECs in the count table 650 may be chosen in consideration of the design requirements of a particular implementation. Such design requirements may include the number and speed of expected INPUT signal 200 baud rates and the cost of implementing a count table 650. For example, when the matching module 640 is a state machine implemented in hardware with a count table 650, the cost of hardware may be a factor in deciding on the number of expected counts ECs to store in the count table 650.

In a preferred embodiment of the present invention, the expected counts ECs in the count table 650 correspond to the four fastest expected INPUT signal 200 baud rates. Thus, the difference may exceed the predetermined threshold when the baud rate of the INPUT signal is slower than the four fastest expected INPUT signal 200 baud rates. The alternate method then used to determine the desired count DC may not need be as time intensive due to the INPUT signal having a slower baud rate and may be implemented by a method known to those skilled in the art such as by conventional software, for example.

Preferably, the INPUT signal 200 is sampled in the center C of a bit time BT as shown in FIG. 5. Thus, the desired count DC provided to the counter 630 will result in sampling the INPUT signal 200 half a bit time after the second transition 260 and in increments of a full bit time BT thereafter. Thus, the INPUT signal 200 may be sampled only once per bit time BT in the center C of each bit time BT.

The counter 630 counts down from the desired count DC. When the count reaches zero, the sampling controller 670 produces a sample input signal SIS. The sample input signal SIS indicates when to sample the INPUT signal 200.

In the exemplary apparatus 600 shown in FIG. 6, the sample input signal SIS is provided to a shift register 680. In response to the sample input signal SIS, the shift register 680 shifts in a sample of the INPUT signal 200 into the shift register 680. When the shift register 680 is full, the samples of the INPUT signal 200 in the shift register 680 are provided to a FIFO 690 which provides the samples to a processor.

The control registers 695 control operating parameters of the apparatus 600. For example, a value in one of the control registers 695 may indicate to the control module 620 whether or not to enable the edge detector 610 to begin looking for the first transition 250 of a start bit 210. Another value in a control register may indicate to the reload register 660 whether to provide the counter 630 with a half count for the first sample after the second transition 260.

The teachings of this invention are not limited to transitions of the start bit of an INPUT signal. For example, when the AT command set is being used, the start bit 210 and bit 0 230 following the start will be as shown in FIG. 2. The teachings of this invention may be applied to determine the baud rate of an INPUT signal using the signal transition 250 at the beginning of the start bit and the signal transition 240 at the end of bit 0 230.

Figure 7:
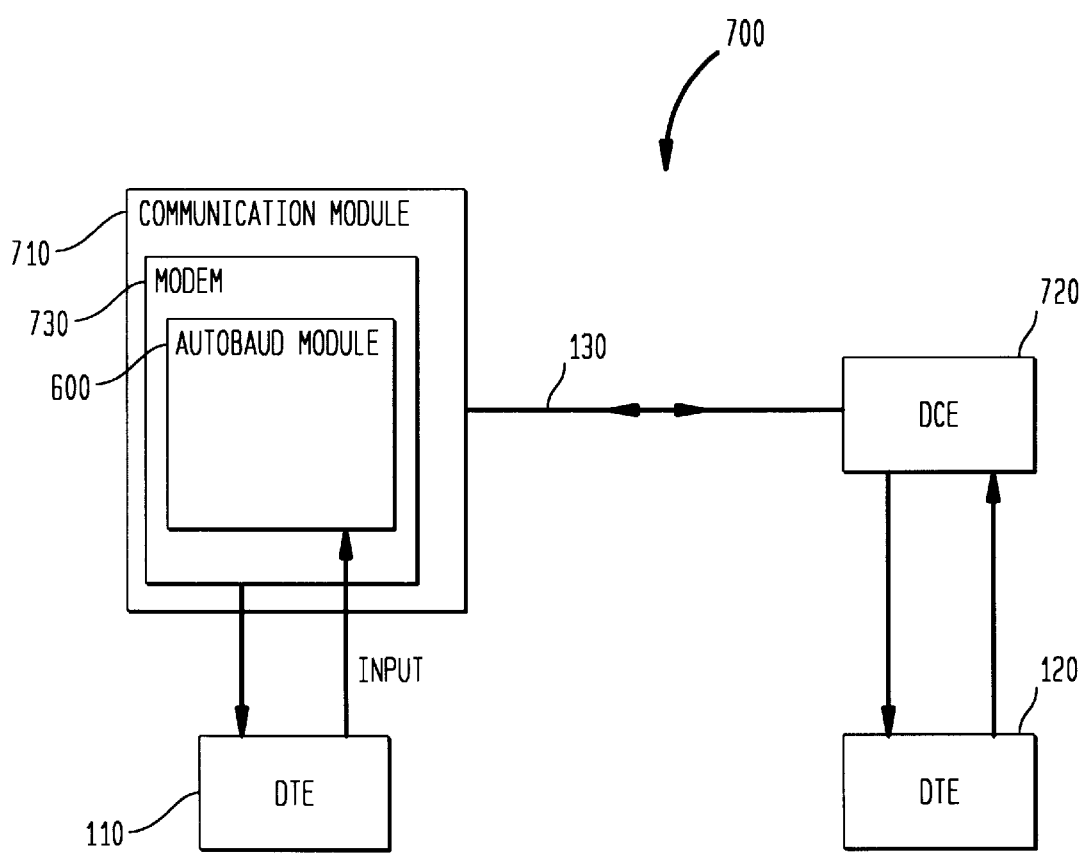
FIG. 7 is a communication system including an apparatus according to the present invention.

A communication system 700 is shown in FIG. 7. Data terminal equipment DTE 110 is connected to the communications medium 130 through a communication module 710. The communication module 710 includes a modem 730 which includes an autobaud apparatus 600 according to the present invention. When the communication module 710 receives an INPUT signal from the DTE 110, the autobaud module 600 detects the baud rate of the INPUT signal as described above.

For autobauding according to the present invention, it is not necessary to continuously sample the INPUT signal 200. The first and second transitions 250, 260 of the start bit 210 are detected by the edge transition themselves. This allows reduced apparatus complexity since it is not necessary to process samples of the INPUT signal to detect the first or second transitions 250, 260. The frequency of the system clock is not dependent on the expected INPUT signal baud rates.

As known to those skilled in the art, the teachings of this invention may be applied to autobauding using the start bit preceding the character "a" as well as the character "A". The teachings of this invention may also be applied autobauding in a communications system that does not use the AT command set.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method of automatically determining a baud rate of an input signal, the input signal having a first transition from a first to a second state and a second transition from the second to the first state, the method comprising the steps of:
   (a) detecting the first transition and generating a first transition signal;
   (b) starting a first counter when the first transition signal is detected;
   (c) detecting the second transition and generating a second transition signal;
   (d) stopping the first counter when the second transition signal is detected, the counter having a measured count representing an interval between the first and second transitions;
   (e) providing at least one expected count, each expected count having a respective predetermined threshold value and corresponding to a possible baud rate of the input signal;
   (f) comparing the measured count to each expected count to provide a respective difference value;
   (g) providing as a desired count the expected count having the least difference value when the least difference value is less than the respective predetermined threshold value of the expected count;
   (h) counting down based on the desired count in a second counter; and
   (i) generating a sampling signal when the second counter has counted down to zero, the sampling signal indicating when the input signal is to be sampled.

2. A method according to claim 1 wherein
   step (h) further comprises counting down based on the desired count when each respective difference value is less than the predetermined threshold value of the respective expected count.

3. A method according to claim 1 wherein each respective predetermined threshold value is a percentage of its respective expected count.

4. A method according to claim 1 wherein step (h) further comprises counting down based on the measured count when each difference value is greater than the predetermined threshold value of the respective expected count.

5. A method according to claim 4 wherein
   step (g) further comprises providing the desired count using an alternate method when each respective difference value is greater than the predetermined threshold value of the respective expected count; and
   step (h) further comprises 1) counting down based on the measured count until the alternate method has provided the desired count and 2) counting down based on the desired count after the alternate method has provided the desired count.

6. A method according to claim 1 wherein the input signal comprises a plurality of bits, each bit having a bit time, wherein the sampling signal is generated in step (i) in the middle of a bit time.

7. A method according to claim 1 wherein the input signal includes a start bit having a first edge and a second edge wherein the first transition represents the first edge of the start bit; and the second transition represents the second edge of the start bit.

8. An apparatus for automatically determining a baud rate of an input signal, the input signal having a first transition from a first to a second state and a second transition from the second to the first state, the apparatus comprising:

an edge detector which detects the first transition and the second transition of the input signal, the edge detector generating a first transition signal when a first transition is detected and generating a second transition signal when a second transition is detected;

a first counter;

a control module which starts the first counter when a first transition signal is received from the edge detector and which stops the first counter when a second transition signal is received from the edge detector, the first counter providing a measured count when the first counter is stopped representing an interval between the first and second transitions;

a count table, the count table storing at least one expected count, each expected count corresponding to a possible baud rate of the input signal;

a matching module which compares the measured count with each expected count to provide a respective difference value, the matching module defining as a desired count one expected count having the least difference value;

a second counter for receiving the desired count and counting down from the desired count; and a sampling controller for generating a sampling signal when the second counter has counted down to zero, the sampling signal indicating when the input signal should be sampled.

9. The apparatus according to claim 8 wherein a reload register receives the desired count from the matching module and provides the desired count to the second counter.

10. The apparatus according to claim 8 wherein the first counter and the second counter are the same counter operating in different modes.

11. The apparatus according to claim 8 wherein the input signal comprises a plurality of bits, each bit has a bit time, and the sampling controller generates the sampling signal in the middle of a bit time.

12. The apparatus according to claim 8 further comprising a shift register coupled to the sampling controller for receiving the sampling signal from the sampling controller, sampling the input signal responsive to the sampling signal, and shifting successive samples of the input signal until a byte of samples has been sampled thereby to organize the input signal into bytes.

13. An integrated circuit comprising an apparatus for automatically determining a baud rate of an input signal, the input signal having a first transition from a first to a second state and a second transition from the second to the first state, the apparatus comprising:

an edge detector which detects the first transition and the second transition of the input signal, the edge detector generating a first transition signal when a first transition is detected and generating a second transition signal when a second transition is detected;

a first counter;

a control module which starts the first counter when a first transition signal is received from the edge detector and which stops the first counter when a second transition signal is received from the edge detector, the first counter providing a measured count when the first counter is stopped representing an interval between the first and second transitions;

a count table, the count table storing at least one expected count, each expected count corresponding to a possible baud rate of the input signal;

a matching module which compares the measured count with each expected count to provide a respective difference value, the matching module defining as a desired count one expected count having the least difference value;

a second counter for receiving the desired count and counting down from the desired count; and a sampling controller for generating a sampling signal when the second counter has counted down to zero, the sampling signal indicating when the input signal should be sampled.

14. A modem comprising:

an edge detector which detects a first transition and a second transition of an input signal, the edge detector generating a first transition signal when a first transition is detected and generating a second transition signal when a second transition is detected;

a first counter;

a control module which starts the first counter when the first transition signal is received from the edge detector and which stops the first counter when the second transition signal is received from the edge detector, the first counter providing a measured count when the first counter is stopped representing an interval between the first and second transitions;

a count table, the count table storing at least one expected count, each expected count corresponding to a possible baud rate of the input signal;

a matching module which compares the measured count with each expected count to provide a respective difference value, the matching module defining as a desired count one expected count having the least difference value;

a second counter for receiving the desired count and counting down from the desired count; and a sampling controller for generating a sampling signal when the second counter has counted down to zero, the sampling signal indicating when the input signal should be sampled.

15. A communication system including an apparatus for automatically determining a baud rate of an input signal, the input signal having a first transition from a first to a second state and a second transition from the second to the first state, the apparatus comprising:

an edge detector which detects the first transition and the second transition of the input signal, the edge detector generating a first transition signal when a first transition is detected and generating a second transition signal when a second transition is detected;

a first counter;

a control module which starts the first counter when a first transition signal is received from the edge detector and which stops the first counter when a second transition signal is received from the edge detector, the first counter providing a measured count when the first counter is stopped representing an interval between the first and second transitions;

a count table, the count table storing at least one expected count, each expected count corresponding to a possible baud rate of the input signal;

a matching module which compares the measured count with each expected count to provide a respective difference value, the matching module defining as a desired count one expected count having the least difference value;

a second counter for receiving the desired count and counting down from the desired count; and a sampling controller for generating a sampling signal when the second counter has counted down to zero, the sampling signal indicating when the input signal should be sampled.

* * * * *